Patented Nov. 30, 1937

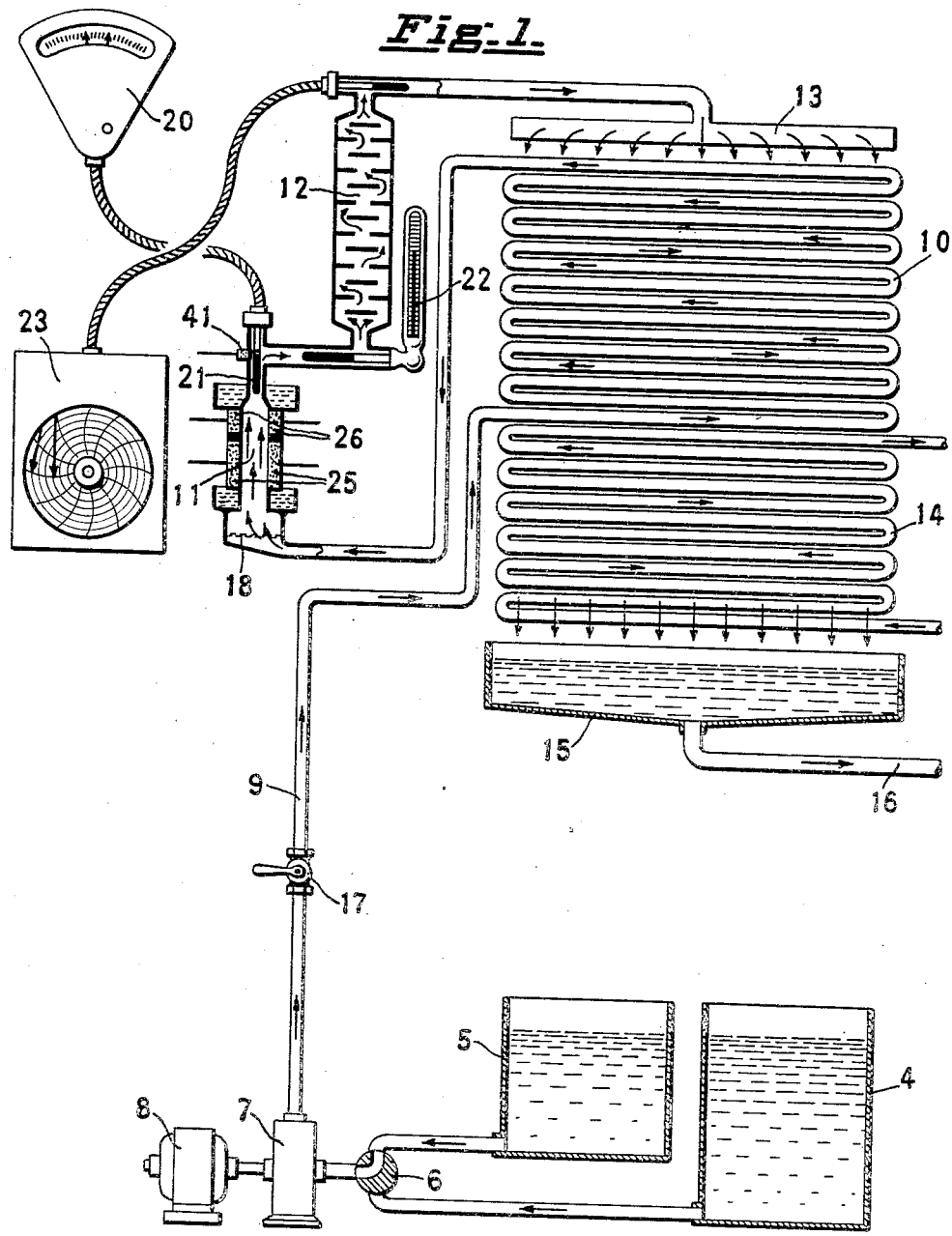

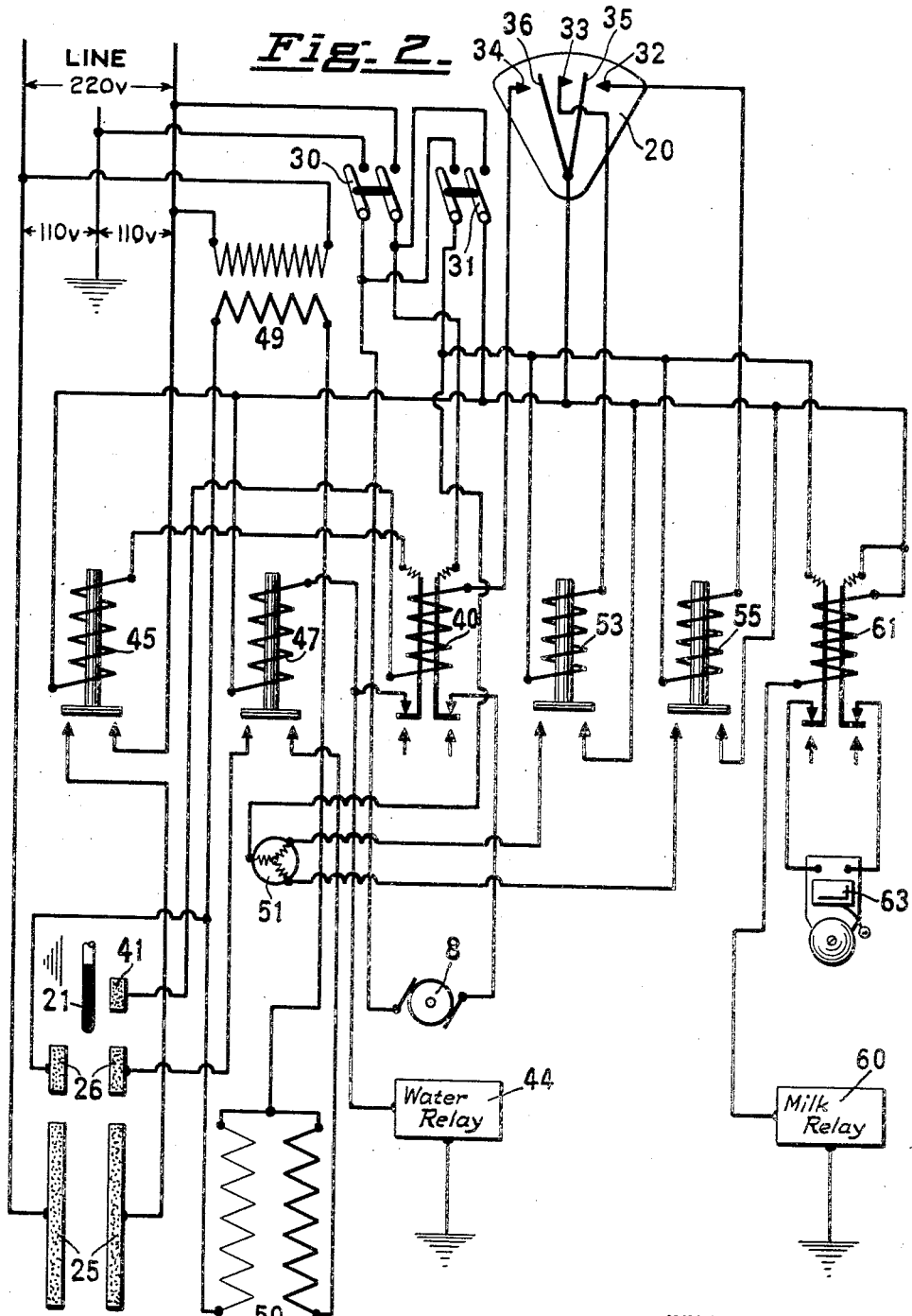

2,100,330

UNITED STATES PATENT OFFICE 2,100,330

PASTEURIZING APPARATUS

Benjamin E. Getchell, Plainville, Conn., assignor to The Trumbull Electric Manufacturing Company, Plainville, Conn., a corporation of Connecticut Application June 6, 1936, Serial No. 83,840

15 Claims. (Cl. 219—40)

My invention principally relates to systems or apparatus for the heating of liquids, particularly milk, by means of electricity for the purpose of what is commonly termed "pasteurization".

My former application Serial Number 752,223 now Patent No. 2,052,396 shows a system of this character arranged to be wholly automatic so that milk coming from various sources which may vary in composition and in temperature will be raised to a definite temperature for a definite period of time and cooled to a temperature suitable for bottling.

One object of my present invention is to provide for a steady flow of liquid and control of the temperature so that the pasteurized and cooled milk may be discharged at a rate to synchronize with the operation of a bottling machine.

A special object is to simplify the apparatus required for the carrying out of the process. In the past it has been proposed to control the operation of the system partially by varying the speed of flow automatically, for instance by controlling or varying the pump motor speed or by automatically controlling a valve in the circulating system.

By my present invention I control the temperature by varying the time during which the milk is heated and by varying the power input to the heating chamber.

Apparatus for carrying out certain steps will be found more fully shown and described in my former application. In my present invention, however, I vary the rate of flow of the liquid by a manually controlled valve in the circulating system and I provide a plurality of pairs of electrodes in the heating chamber, one or more of which may be entirely deenergized so that the flow time during which a pasteurizing current is applied may be increased or decreased by cutting in or out one or more pairs of the electrodes.

I further control the temperature by selectively varying the voltage applied to one pair of the electrodes. The electrodes are protected by suitable water cooling means to prevent overheating and further provision is made for causing the milk to return to the heating chamber in case it fails to reach a predetermined minimum temperature. Variations in the temperature of the raw milk, variations in the electrical conductivity of the milk, variations in room temperature and variations in line voltage are at least partially compensated for automatically by a system of relays and a voltage regulator all under the control of a switching device or contactor actuated by a thermostatic device having its sensitive element located in the path of the heated liquid.

Fig. 1 is a diagrammatic view showing the liquid circulating system with the thermostatically actuated control contactor and recording device.

Fig. 2 is a diagrammatic view showing the electrical system.

The liquid may be stored in one or more reservoirs such as 4 and 5, one of which for instance may contain the raw milk and the other a suitable solution to be used in starting operation. A valve 6 serves to direct the flow of liquid from one tank or the other to the pump 7. This pump is driven by an electric motor 8 and is of such a character that when the pump stops the liquid can flow backward through the pump.

A circulating system includes a pipe 9, a regenerative coil, heat exchanger or preheater 10, a heating chamber 11, a holding chamber 12, and a spreader or spray head 13 from which the heated liquid trickles down over the preheater. As it is usually desirable to cool the treated liquid to a predetermined low temperature, I provide a cooling coil 14 above the collecting trough 15 from which the pasteurized and chilled liquid passes by pipe 16 to a bottling machine or other disposal point.

The motor 8 is of the induction type intended to run at a substantially constant speed and the rate of flow of the liquid is adjusted by means of the manually operable valve 17 in the pipe line 9. The liquid may pass through a filter 18 located in the bottom of the heating chamber or any other convenient point. It will be understood that all parts of the liquid circulating system are so designed and constructed that they may be readily separated and cleaned and readily re-assembled.

A switching device or temperature controlled contactor 20, such as shown in my former application, has a sensitive element or bulb 21 at the top of the heating chamber. The temperature of the liquid immediately as it leaves the heating chamber is visually indicated by a thermometer 22 and the temperature of the liquid after it has passed through the holding chamber is recorded in instrument 23. The electrodes of the heating chamber are cooled by a flow of water over their outer surface.

Instead of having a single pair of electrodes at opposite sides of the heating chamber as in my former application, I provide a plurality of pairs of electrodes such as 25 and 26 which are independently connected in the circuit.

It will thus be seen that with the liquid passing through the heating chamber at a given rate, current will be applied to the liquid for the length of time that it takes to pass between the various electrodes, thus by cutting out or deenergizing one pair of electrodes the liquid will be subjected to electrical action only during the time required to pass the live electrodes.

*General description of electrical circuits*

The system is designed to operate on a standard commercial 110/220 volts 3 wire A. C. circuit.

In the drawings the parts are shown diagrammatically for purposes of clarity in illustration. It must be understood that all the relays and magnetic contactors are drawn to indicate a downward movement of their contact making portions when the coils thereof are energized, and to indicate an upward movement when the coils are de-energized.

A manually operated switch 30 controls the pump motor 8. It also energizes the line side of switch 31.

The control switch 31 is dependent upon switch 30 for its supply of energy. This switch 31 furnishes the power to all of the control circuits, and also to the alarm circuit.

Temperature controlled contactor 20 is operated by means of a bulb or sensitive element 21 in the milk flow, just above the heating chamber and is responsive to variations in temperature of the milk. In it are three contacts: 34, which actuates the circuit guarding against milk flow below the minimum pasteurizing point; 33, to correct temperature if it drops ½ degree or more below the pasteurizing point; and 32, to correct temperature if it rises ½ degree or more above pasteurizing point.

The three stationary contacts 32, 33 and 34 cooperate with two movable contact members 35 and 36. The movable members are actuated in a well known manner by the thermostatic device whose bulb 21 is above the heating chamber.

The lower unregulated section 25 of the heating chamber 11 is energized from the 220 volt line and is not under variable control.

The upper regulated section 26 of the heating chamber is under the variable control of the voltage regulator 50.

A water relay 44 is in the circuit of the coils of contactors 45 and 47 furnishing power to the heating chamber. Failure of cooling water flow over the electrodes of the heating chamber will cause this relay to interrupt the supply of power to the heating chamber.

Milk relay 60 is in the circuit with the alarm contactor 61. If the milk in the raw milk tank drops below predetermined level, relay 60 will open the magnet circuit of this contactor, allowing the alarm circuit to go on and notify the operator.

The pump motor 8 is under manual control of switch 30, and under automatic control of relay 40.

An induction regulator 50 furnishes variable power to section 26 of the heating chamber. This induction regulator is automatically operated by its motor 51 to furnish any voltage from 0 to 220 to the heating chamber section 26. Voltage is governed by milk temperature through the action of contactor 20.

The regulator motor 51 is actuated by relays 53 and 55 which are under the automatic control of the temperature controlled contactor 20.

The low milk alarm 63 is under control of relays 60 and 61.

An auxiliary electrode 41 is in the pump stop circuit. It is in the circuit of relay 40 and if milk is flowing by this electrode 41 when the contact arm 36 engages contact 34 of contactor 20, a circuit is completed through relay 40 which opens the pump motor circuit. If there is no conducting fluid such as milk or saline solution beyond the top of the heating chamber at 41 the circuit through relay 40 will not be completed and the pump will not stop.

A magnetic contactor 45 controls the supply of power to the lower section 25 of the heating chamber. This contactor is under automatic control of the water relay 44 and pump stop relay 40.

A magnetic contactor 47 furnishes power from the induction regulator to the upper section 26 of the heating chamber. This contactor 47 is under automatic control of water relay 44.

At 49 is a 220 volt to 110 volt transformer. It furnishes the regulator with power at 110 volts and also isolates the regulator circuit from the main line circuit so as to prevent cross feeds in the heating chamber.

Relay 40 controls the pump circuit and also controls the coil circuit of contactor 45. This relay is under the control of the minimum pasteurizing point contact, 34, of 20. When this relay 40 is energized it opens both the pump circuit and the coil circuit of contactor 45.

A relay 53 supplies power to the induction regulator motor 51 causing it to operate to raise voltage on the heating chamber 26. Relay 53 is under control of contactor 20.

Relay 55 controls the motor 51 of the induction regulator 50 and causes the motor to operate to lower the voltage on the heating chamber 26. Relay 55 is under control of 20.

The numeral 61 indicates a relay which is normally energized and holds the circuit of alarm 63 open. Relay 61 is under the control of milk relay 60.

*Normal operation*

Under normal conditions with the temperature of the milk flow within ½ degree of the set pasteurizing temperature, closed switch 30 energizes the pump motor, and closed switch 31 energizes the operating circuits. The magnet of contactor 45 is energized, causing its contacts to close and furnish power from the 220 volt line to section 25 of the heating chamber.

The magnet of contactor 47 is energized causing its contacts to close and furnish power from the induction regulator 50 to section 26 of the heating chamber. When the main line switch, which is not shown in the drawings, is closed, transformer 49 is immediately energized and the primary winding of induction regulator 50 is also energized, but power is not supplied from 50 to section 26 until control switch 31 is closed.

A circuit is also established through relay 61 causing its contacts to move downward and hold the alarm circuit open.

Of course, as before stated, the magnets of contacts 45 and 47 will not be energized unless water is flowing over the electrodes of the heating chamber 25 and 26 thus completing their circuit at 44.

*Normal low temperature control*

If the treated milk drops to a temperature one-half degree, or more, lower than the pasteurizing temperature set in contactor 20, contact arm 35 engages contact 33 and establishes a circuit through the coil of relay 53 causing its contacts to move downward and complete a circuit through induction regulator motor 51, starting this motor in the proper direction to raise the voltage on the heating chamber 26. As soon as this rising voltage has increased the temperature of the milk flow to within one-half degree of the pasteurizing temperature, contact arm 35 will disengage from contact 33 and will open the circuit through relay 53 and normal operation will be resumed as previously described.

High temperature control

If the treated milk rises to a temperature ½ degree or more, over the pasteurizing temperature, contact arm 35 engages contact 32 of contactor 20 and establishes a circuit through the coil of relay 55 causing its contacts to move downward and establish a circuit through regulator motor 51 causing it to operate to lower the voltage through the heating chamber 26.

As soon as the temperature has come within ½ degree of the pasteurizing temperature set in contactor 20, contact arm 35 will disengage from contact 32 and will open the circuit through regulator motor 51 and normal operation will be resumed as described above.

Abnormal low temperature control

For practical purposes in the pasteurization of milk, contactor 20 is set so that contact 34 corresponds to a 160° minimum pasteurizing limit. If the temperature of the treated milk drops to this low limit, contactor 20 has first established a circuit through relay 53 causing the regulator motor to boost the voltage through chamber 26 in an endeavor to bring the temperature back to normal. (See "Normal low temperature control".) This it has failed to do and contact arm 36 will now engage contact 34 thus establishing the circuit energizing the coil of relay 40.

Energizing the coil of this relay 40 causes its contacts to open the pump motor circuit and stop the forward flow of milk. Relay 40 also opens the magnet circuit of contactor 45 which in turn opens the circuit to section 25 of the heating chamber.

With the pump not operating, the milk flow immediately reverses and flows backward through the heating chamber. Section 25 of the heating chamber is de-energized so as to cut down the heat supply to this backward milk flow.

Section 26 of the heating chamber is energized to furnish a small amount of heat to this back flow. As soon as all the milk is returned to the heating chamber the milk contact to auxiliary electrode 41 is broken, which de-energizes the coil circuit of relay 40. This immediately re-energizes the pump motor circuit and the milk is started on forward flow again, but as soon as it reaches electrode 41 and the control bulb 21 of contactor 20, the pump will again stop due to re-establishing the circuit through the coil of 40 at 41. If the milk is now above 160 degrees due to the heat added in section 26, contact arm 36 will disengage from contact 34 which will in turn de-energize the coil circuit of relay 40 allowing the pump to continue in operation. If the milk is not up to pasteurizing temperature, contactor 20 will maintain this circuit through the coil of relay 40 and it will hold the pump motor circuit open and the milk will again flow back through chamber 26 for an additional reheating, and this operation will be continued until the temperature reaches the proper point, at which time normal operation will be resumed as described above. Each time relay 40 de-energizes the pump motor circuit it also opens the coil and contact circuits of 45, which de-energizes 25. When 40 again energizes the pump motor it also causes 45 to re-energize 25.

Cooling water failure control

In case of failure of flow of cooling water over the electrodes of the heating chamber sections 25 and 26, which is liable to cause the milk to burn to the surfaces of the electrodes when passing through, relay 44 opens the ground circuit of the magnets of contactors 45 and 47. This causes these contactors to de-energize the heating circuits of 25 and 26. In this case the temperature of the milk will immediately drop and contact arm 36 will engage contact 34 to energize the coil of relay 40 which will immediately stop the pump motor. The milk will now flow back through the heating chamber but will not be reheated because the chamber is de-energized. As soon as the milk flows back and opens the circuit at auxiliary electrode 41 the pump will again start and test will be made on the temperature periodically as explained under "Abnormal low temperature control". In this case, however, the temperature will not come up because both sections of the heating chamber are de-energized and operation will not be resumed until cooling water flow is re-established over the electrodes of heating chamber sections 25 and 26. As soon as this is done 26 will be energized and as soon as the heat is again brought up to the proper pasteurizing temperature, operation will be resumed as described under "Normal operation".

Low milk alarm

For the purpose of notifying the operator that his supply of raw milk is getting low, relay 60 is placed in the raw milk supply, and as soon as the level of the milk drops below a predetermined point the circuit through the coil of relay 61 will be broken. This allows the contact of relay 61 to close a circuit through alarm 63 which may be a bell (as shown), a light, or any other electrically operated signaling device.

Starting the plant

To start the operation of this apparatus, either one of two methods may be employed, the first and preferable of which involves the use of a solution of salt in water of about the same electrical conductivity as the milk. In this method, the temperature controller 20 is set for a pasteurizing temperature above 170°, at which setting contact arm 36 cannot engage contact 34 and the pump is not stopped on flow temperatures below the minimum pasteurizing point. Tank 4 is provided with milk and tank 5 is provided with the saline solution. Valve 6 is turned to permit fluid from the saline solution tank to flow through the system. Valve 17 is set to approximately the flow desired. The electrode cooling water is turned on, and the waste water from the electrodes actuates the water relay 44 so that when control switch 31 is closed, circuit will be established through magnetic contactors 45 and 47.

Switch 30 is now closed, which starts the pump motor 8 and supplies power to the line side of switch 31. Switch 31 is now closed, which actuates the control circuits and causes power to be supplied to heating chamber sections 25 and 26. Due to the fact that contact arm 35 is engaged with contact 33 because of the low temperature of the bulb 21, the coil of relay 53 is energized, closing its contacts and raising the voltage in section 26 of the heating chamber, as described above under "Normal low temperature control". Thus during the period of bringing the saline solution from cold up to the set pasteurizing point, both sections of the heating chamber are energized and the highest voltage is applied to section 26.

The fluid passing through the heating chamber is gradually raised in temperature and is passed over the regenerative coils 10. This results in raising the temperature of the fluid as it enters the heating chamber, and further raises the temperature of the fluid as it leaves the heating chamber. This increased heat, in turn, raises the temperature still further and the cycle continues until the temperature of the treated fluid reaches the pasteurizing temperature as set at 20.

The contactor 20 may now be set at a desired working pasteurizing temperature, say 162°. This will cause contact arm 35 to disengage from contact 33 and open the coil circuit through relay 53, establishing normal operating conditions. Almost immediately contact arm 35 will engage contact 32, due to the new lower setting, and the operation described under "High temperature control" will take place, resulting in the decrease of power to section 26 of the heating chamber. The pasteurizing temperature will then drop rapidly until it reaches within one-half degree of 162°, for which 20 is set. At this time contact arm 35 will disengage from contact 32, open the circuit through regulator motor 51, temperature will cease to fall, and normal operation will start. The temperature of the treated fluid will now stabilize at 162° and any variation one-half degree above or below that point will cause proper operation of the induction regulator to correct the temperature to the set point.

Valve 6 is now thrown over so as to cause the milk to flow from tank 4 and follow the saline solution through the system, thus driving all of the water out of the system and establishing a steady flow of milk. As soon as this is accomplished, the milk is led to the bottling machine by pipe 16. If the speed of flow does not synchronize with the bottling machine speed, it may be increased or decreased by manual operation of valve 17 and the controls will act to maintain the temperature of the pasteurized milk at the proper point automatically, regardless of any change that may be made within reasonable limits.

The process of shutting down the plant is the reverse of starting, and is accomplished simply by throwing the valve 6 in position to supply saline solution to the pump.

This solution follows the milk through the system, driving it all out, at which time the controls may be thrown off and the plant shut down.

By the other method the plant may be started directly with the raw milk. In this method valve 6 is thrown into position to feed raw milk into the system. Electrode cooling water is turned on, as before, temperature controlled contactor 20 is set at the desired pasteurizing temperature (say 162°), switch 30 is closed, starting the pump, and switch 31 is immediately closed, which will put into operation the control system. The pump will operate until the milk reaches electrode 41. The temperature of the first flow of milk will be far below the pasteurizing temperature due to the fact that regeneration of heat in the coils 10 has not yet been established. Arm 35 will engage contact 33 causing the regulator motor to set regulator 50 to supply maximum voltage to section 26 so as to accelerate the heating action. Arm 36 will engage contact 34 and operation of the controls will follow as described under "Abnormal low temperature control", the pump starting and stopping, and tests being made by bulb 21 until the milk reaches the proper temperature, at which time it will be permitted to leave the heating chamber.

This milk will again be followed by milk below the minimum pasteurizing point, because of the fact that regeneration has not yet been established, and this second lot of milk will be retained in the electrode chamber until it reaches the proper pasteurizing point, as previously described.

This operation will continue until finally enough milk has been permitted to pass to bring the regenerative temperature up sufficiently high to permit continuous operation. The plant will then go into normal operation until all of the milk has been pasteurized.

The process of shutting down is practically the same as in the first method except that fresh water may be used to drive the milk out of the system.

In this system the preheater 10 is preferably designed to raise the temperature of the cool liquid approximately two-thirds of the temperature rise desired and the heating chamber adds the necessary additional heat units to raise the liquid to the pasteurizing temperature. From the foregoing it will be seen that part of the heat is added conductively through the preheater coils and part of the heat is added electrically in a plurality of stages, which stages are capable of being regulated so as to cut one stage in or out of circuit and to vary the voltage applied to the other stage, so as to afford a maximum flexibility of control.

In designing the system above described, it is planned that it will take some ten seconds for the milk to flow through the heating chamber. A gradual variation of the power supply to the entire length of the heating chamber would not produce a full effect of the adjustment until ten seconds after adjustment ceases.

Therefore, adjustment action would continue until the milk at the top of the heating chamber reached the desired temperature, but after this time, when the adjustment action ceases, the temperature would continue to rise for approximately ten seconds.

In the case of lowering the temperature the same effect would be produced and the lagging result would be to produce a constant hunting above and below the required pasteurization point. The longer the heating chamber, the wider range of this hunting action would be produced. Counterwise, the shorter the chamber, the narrower the range of hunting, but in the case of the shorter chamber it would be necessary to reduce the rate of flow or increase the voltage applied in order to accomplish the desired result.

I therefore in effect, by providing a plurality of pairs of electrodes, divide the chamber into a number of sections. The lower section serves as a preheater and the upper section, being quite short, has just enough capacity to take care of the ordinary temperature variations. In this case I make the upper section of the electrodes short enough so as to reduce hunting to something below one half a degree of temperature change and yet give it sufficient capacity to take care of all necessary adjustments under normal conditions.

In case the pump motor is shut down due to the temperature falling below 160° or such other minimum as may be predetermined, the milk flows backward and downward through the electrode chamber for additional heating. It is desirable to add approximately 35 or 40 degrees to the milk temperature while flowing through the chamber under action of the pump pressure.

The backward or downward flow due to the action of gravity is only about one quarter as fast as the flow provided by the action of the pump. If the full voltage was still supplied to the heating chamber while the milk flows downward, it would add four times as much heat as was produced by the forward or upward flow or about 120° in addition to what it already has. This would be likely to bring the temperature very much above the safe point and seriously impair that portion of the milk under treatment which, when mixed with the previously treated milk, would ruin the batch. Therefore, when the pump stops and the milk flows downward, I deenergize the larger lower section of the heating chamber and only supply current to the upper shorter section so as to avoid the danger of raising the milk to too high a temperature.

I claim:

1. In a liquid heating system, a heating chamber having at least two pairs of electrodes, means for applying alternating current to the pairs of electrodes, thermostatically controlled means for varying the voltage applied to one pair of electrodes while maintaining the voltage applied to another pair and means for forcing liquid through the heating chamber.

2. In a liquid heating system, a heating chamber having two pairs of electrodes, means for applying alternating current to the electrodes, means for forcing liquid through the heating chamber, thermostatically controlled means for increasing the voltage applied to one pair of electrodes when the temperature of the heated liquid falls a certain amount and stopping the forcing means and cutting off current from the other pair of electrodes when the temperature falls a certain greater amount.

3. In a liquid heating system, a heating chamber having two pairs of electrodes, means for applying alternating current to the electrodes, means for forcing liquid through the heating chamber, thermostatically controlled means for increasing the voltage applied to one pair of electrodes when the temperature of the heated liquid falls a certain amount and stopping the forcing means and cutting off current from the other pair of electrodes when the temperature falls a certain greater amount, and means for starting the forcing means when the level of the liquid falls below a certain point.

4. In a liquid heating system, a heating chamber having two pairs of electrodes, means for forcing liquid upwardly through the chamber, thermostatically controlled means for reducing the voltage applied to one pair of electrodes when the temperature of the heated liquid rises above a predetermined point and for decreasing the voltage applied to this pair of electrodes when the temperature falls below a certain point and for stopping the forcing means and cutting off the current applied to another pair of electrodes when the temperature falls a certain greater amount.

5. In a liquid heating system, a heating chamber having two pairs of electrodes, means for forcing liquid upwardly through the chamber, thermostatically controlled means for reducing the voltage applied to one pair of electrodes when the temperature of the heated liquid rises above a predetermined point and for decreasing the voltage applied to one pair of electrodes when the temperature falls below a certain point without changing the voltage applied to another pair of electrodes.

6. In a liquid heating system, a heating chamber having a plurality of pairs of electrodes, an electric motor driven pump for forcing liquid upwardly through the heating chamber and permitting liquid to flow downwardly through the heating chamber when the pump stops, means for varying the rate of flow of the liquid through the heating chamber, and thermostatically controlled means for varying the voltage applied to one pair of electrodes when the temperature of the heated liquid varies a predetermined amount and cutting down the voltage applied to the other pair of electrodes.

7. In a liquid heating system, a heating chamber having at least two pairs of electrodes, means for forcing liquid through the heating chamber at a controlled rate, means for applying alternating current to the pairs of electrodes, thermostatically controlled means for varying the voltage applied to one pair of electrodes and means for cutting off the voltage applied to another pair of electrodes.

8. In a liquid heating system, a heating chamber having two pairs of electrodes, means for applying alternating current to the electrodes, means for forcing liquid through the heating chamber, thermostatically controlled means for stopping the forcing means and simultaneously varying the voltage applied to one pair of electrodes while cutting off the current from another pair of electrodes.

9. In a liquid heating system, a heating chamber having two pairs of electrodes, one pair of electrodes being substantially shorter than the other pair, means for applying alternating current to the electrodes, means for forcing liquid through the heating chamber, thermostatically controlled means for increasing the voltage applied to the shorter pair of electrodes when the temperature of the heated liquid falls a certain amount and stopping the forcing means and cutting off current from the other pair of electrodes when the temperature falls a certain greater amount.

10. In a liquid heating system, a heating chamber having two sets of electrodes, one set of which is much longer than the other set, means for applying a substantially constant voltage to the longer set and means for applying a variable voltage to the shorter set.

11. In a pasteurizing system, a heating chamber having two pairs of electrodes, one pair being longer than the other, means for forcing liquid through the heating chamber and means for stopping the forcing action when the temperature of the heated liquid falls below a certain degree and permitting the liquid to return to the heating chamber and at the same time cutting off current from the longer pair of electrodes and means for applying a variable voltage to the shorter pair of electrodes.

12. In a pasteurizing system, a heating chamber having two pairs of electrodes, one pair being longer than the other, means for forcing liquid through the heating chamber, means for stopping the forcing action when the temperature of the heated liquid falls below a certain degree and permitting the liquid to return to the heating chamber and at the same time cutting off current from the longer pair of electrodes, means for applying a variable voltage to the shorter pair of electrodes and means for starting the forcing action when the liquid has been returned to the heating chamber.

13. In a pasteurizing system, a heating chamber having two pairs of electrodes, one pair of which is much longer than the other, means for forcing liquid through the heating chamber, means for applying a substantially constant voltage to the longer pair of electrodes, means for applying a variable voltage to the shorter pair, means for increasing the voltage applied to the shorter pair when the temperature of the heated liquid falls a certain amount, and means for de-energizing the longer pair of electrodes when the temperature of the heated liquid falls below a certain lower point and at the same time stopping the forward flow of liquid through the heating chamber and causing the heated liquid to return to the heating chamber.

14. In a pasteurizing system, a heating chamber having two pairs of electrodes, one pair of which is much longer than the other, means for forcing liquid through the heating chamber, means for applying a substantially constant voltage to the longer pair of electrodes, means for applying a variable voltage to the shorter pair, means for increasing the voltage applied to the shorter pair when the temperature of the heated liquid falls a certain amount, means for deenergizing the longer pair of electrodes when the temperature of the heated liquid falls below a certain lower point and at the same time stopping the forward flow of liquid through the heating chamber and causing the heated liquid to return to the heating chamber, and means for starting the forward flow when the liquid has returned to the heating chamber.

15. In a pasteurizing system, a heating chamber having a plurality of pairs of electrodes arranged with one pair above another, means for applying an alternating current to the electrodes, means for forcing a liquid to flow upwardly through the heating chamber, means for stopping the upward flow when the temperature of the heated liquid falls below a predetermined point and simultaneously cutting off current from one pair of electrodes while the liquid flows downwardly in the heating chamber, means for restarting the upward flow when the liquid in the heating chamber falls below a predetermined level and means for changing the voltage applied to at least one of the other pairs of electrodes when the temperature of the heated liquid changes a predetermined amount.

BENJAMIN E. GETCHELL.